United States Patent Office 3,764,502
Patented Oct. 9, 1973

3,764,502
WATER-SOLUBLE SODIUM ACRYLATE POLYMERS OF HIGH MOLECULAR WEIGHT
Alfred J. Restaino, Wilmington, Del., assignor to ICI America Inc., Wilmington, Del.
No Drawing. Continuation of abandoned application Ser. No. 782,000, Dec. 6, 1968. This application Aug. 12, 1971, Ser. No. 171,389
Int. Cl. C08f 13/00, 1/16, 3/44
U.S. Cl. 204—159.22          9 Claims

ABSTRACT OF THE DISCLOSURE

High-molecular weight, water-soluble polymers of sodium acrylate and aqueous gels comprising from 25% to 40% by weight thereof, are prepared by irradiating solutions of sodium acrylate with high energy ionizing radiation, at a pH of from 4 to 14, and at a dose rate of less than 200,000 rads per hour to a total dose of from 1,000 rads to that sufficient to convert substantially all of the monomer to polymer. Polymers, and aqueous gels thereof, having intrinsic viscosities ranging upwards from 6 deciliters per gram, measured in 2 N sodium hydroxide at 25° C., are obtained over the entire indicated range of radiation intensities and total dosages in the more concentrated solutions. The polymers, or their aqueous gels, have utility as thickening and flocculating agents.

---

This is a continuation of application Ser. No. 782,000, filed Dec. 6, 1968, now abandoned.

This invention relates to the production of water-soluble polymer of sodium acrylate having high molecular weight under the influence of high energy ionizing radiation, to the polymers so-produced and to aqueous gels of such polymers.

That acrylic acid and its salts may be polymerized under the influence of high energy ionizing radiation is well known in the prior art. The radiation induced polymerization of water-soluble salts of acrylic acid to form water-insoluble polymers is disclosed, for example, in U.S. Pat. No. 3,090,736.

In accordance with the present invention, it has been found that aqueous solutions of sodium acrylate, when subjected to high energy ionizing radiation under the conditions set forth hereinbelow, form aqueous gels of high-molecular weight, substantially water-soluble polymerized sodium acrylate. The gels so-formed may, without recovery of the polymer therefrom, be employed as thickening agents for aqueous solutions or as flocculating agents for the clarification of aqueous media containing finely divided solids suspended therein. They are particularly effective as agents for flocculating and precipitating suspended solids from the alkaline aluminate digestion liquors obtained in the recovery of alumina from bauxite by the Bayer process.

Alternatively, the formed high-molecular weight polymer may be recovered from the aqueous gel by means such as subdivision of the gel and drying, or precipitation of the polymer with organic liquids. The polymer so-obtained may be redissolved and utilized for the same purposes as the gel.

In broad terms, the high-molecular weight, water-soluble polymers of the invention are prepared by subjecting an aqueous solution of sodium acrylate containing from 25% to 40% by weight of dissolved sodium acrylate and having a pH of from 4 to 14 to high energy ionizing radiation at an intensity of up to 200,000 rads per hour to a dose ranging upwards from 1,000 rads to that required to convert substantially all of the monomer to polymer. In order to convert substantially all of the charged monomer in a desirably short irradiation period, it is preferred to employ radiation intensities ranging upwards from 5,000 rads per hour. However, as will be illustrated hereinbelow, polymers of extremely high molecular weight are obtained by operating at lower radiation intensities and interrupting the polymerization before the monomer has been completely consumed. In such cases, intensities as low as 250 rads per hour may be employed. Moreover, it is preferred to employ radiation intensities of not more than 50,000 rads per hour, especially in solutions of high concentration, to maximize the intrinsic viscosities of the resulting polymer and obtain better control of the polymerization reaction.

It has been found that the polymerization rate is increased and the tendency to form insoluble cross-linked polymers decreased in the high end of the pH range recited above, and it is, accordingly, preferred to carry out the polymerization in solutions having a pH of 8 or higher. The sodium acrylate solutions having pH value of less than about 8 to 9 will contain corresponding proportions of unneutralized acrylic acid. Sodium acrylate solutions of the desired pH for use in the present invention thus may be mixtures of sodium acrylate and acrylic acid. These solutions may conveniently be obtained by neutralizing acrylic acid solutions with sodium hydroxide or an alkaline sodium salt such as sodium carbonate.

The high energy ionizing radiation employed may be electromagnetic or particulate in nature, and includes accelerated electrons, protons, neutrons, etc., as well as X-rays and gamma rays. The solution is irradiated, in accordance with the invention under the conditions above-recited for a time sufficient to subject the reaction mixtures to a total dose of 1,000 rads and preferably until the monomer is at least 50% converted to polymer. The upper limit of the radiation dose to be applied is that which will just convert substantially all of the monomer to polymer. Excessive radiation dose results in insolubilization of the formed polymer and is to be avoided. Since the relation between conversion and total radiation dose varies markedly with concentration and pH of the solution and with the radiation intensity, the maximum dose to be employed will vary correspondingly. Within the concentration and intensity ranges aforesaid, the total dose requirement will rarely be greater than about 50,000 rads.

The extent of conversion of monomer may be determined by cutting a weighed sample of the gel into small pieces and leaching water and unreacted sodium acrylate therefrom with methanol. The polymer, insoluble in methanol, is dried to constant weight; and from its weight, the weight of sample taken, and the known concentration of the starting monomer solution, the percentage conversion is calculated. Alternatively, a sample of the gel may be finely subdivided and unreacted monomer extracted therefrom with methanol in a Soxhlet apparatus. An aliquot of the extract is analyzed for unsaturation by conventional means and its acrylate content calculated therefrom. This is a direct measure of the unreacted monomer.

The gels and polymers of this invention may be modified, if desired, by incorporating water-soluble non-polymerizing solids into the monomer solution undergoing polymerization. Particularly it has been found that the presence of sodium carbonate or of water-soluble surfactants, in proportions up to 10% by weight of the solution, serve to improve the wettability and rate of solution of the very high molecular weight polymers of the invention.

In general, it will be found that in monomer solutions of high concentration (near 40%) irradiated at low intensity (less than 10,000 rads per hour) the total dose should be kept below 8,000 rads to prevent over reaction. At higher dose rates and lower concentrations, the total dose may be correspondingly increased.

Over the entire range of reaction conditions recited above water-soluble sodium acrylate polymers of high molecular weight are obtained as is indicated by their high intrinsic viscosities. In accordance with accepted art practice, intrinsic viscosity referred to herein is expressed in deciliters per gram (dl./g.) and is the limiting value of the ratio of the specific viscosity of a solution of a polymer to its concentration in grams per deciliter as the concentration approaches zero. The specific viscosity of a polymer solution is concentration dependent and is the quotient obtained by dividing the viscosity of the solvent into the difference between the viscosities of the solution and the solvent. The intrinsic viscosities reported herein were determined in 2 N sodium hydroxide solution at 25° C.

It has been determined that the intrinsic viscosity of sodium acrylate polymers prepared by irradiation of sodium acrylate solutions under the conditions delineated above is related to the monomer concentration, radiation intensity, and extent of conversion of monomer to polymer and that a first approximation of the relationship is afforded by the following empirical equation:

$$\eta_i = \frac{[M]^{2.2} \times 5.17 \times 10^{-2}}{[I]^{0.14} \times [C]^{0.36}}$$

wherein

M is the monomer concentration in percent by weight
C is the percent conversion of monomer to polymer from 50 to 100
I is the intensity of radiation in rads per hour, and
$\eta_i$ is the intrinsic viscosity in dl./g. determined in 2 N sodium hydroxide at 25° C.

Particularly valuable polymers and aqueous gels containing them are those wherein the water-soluble sodium acrylate polymer has an intrinsic viscosity of 6 or more. From the foregoing equation, it can be calculated that such preferred polymers are most readily prepared in solutions of high concentration; e.g., at 40% monomer concentration, the entire range of radiation intensities and conversions to any extent will yield polymers of intrinsic viscosity of about 6 or more. As the monomer concentration decreases, other factors being equal, the intrinsic viscosity of the formed polymer decreases; and, at the lower end of the operative concentration range (25%), high viscosity polymer is obtained only at radiation intensities of 1,000 rads or less per hour and/or at 50% conversion. As a guide for choosing reaction conditions for obtaining polymers of desired intrinsic viscosity, values thereof calculated by inserting representative concentrations, intensities, and conversions in the foregoing equation are tabulated below:

INTRINSIC VISCOSITIES PREDICTED FROM EQUATION

| Monomer concentration, percent | Intensity, rads/hr. | Conversion, percent | Intrinsic viscosity, dl./g. |
|---|---|---|---|
| 40 | 1,000 | 50 | 16.1 |
| 40 | 10,000 | 100 | 9.5 |
| 40 | 50,000 | 50 | 8.5 |
| 40 | 100,000 | 100 | 6.6 |
| 30 | 5,000 | 50 | 6.9 |
| 30 | 5,000 | 100 | 5.4 |
| 30 | 10,000 | 50 | 6.2 |
| 30 | 50,000 | 100 | 3.9 |
| 25 | 1,000 | 50 | 5.8 |
| 25 | 10,000 | 100 | 3.2 |

The invention will be more clearly understood from the following specific examples which are presented for illustrative purposes and are not to be considered as defining or limiting the invention.

EXAMPLE I 61.9 grams of sodium hydroxide were dissolved in 200 grams of distilled water and cooled to 25° C. 115 grams of acrylic acid were stirred into the solution with cooling to form an aqueous solution containing 39.5% by weight of dissolved sodium acrylate. The pH of the solution was 6.3. It was transferred to a polyethylene bag, flushed with high purity nitrogen and sealed. The bag and its contents were then irradiated for 45 minutes with gamma rays from a cobalt-60 source at an intensity of 8,700 rads per hour. The total dose was 6,500 rads. The contents of the bag were thus converted to a rubbery gel. The conversion of monomer to polymer was in excess of 90% as determined by extracting unreacted monomer from the gel with methanol and determining its acrylate content by analysis for double bond unsaturation.

The polymer was recovered by extruding the gel through an orifice of 0.037 inch diameter at a pressure of 2,500 pounds per square inch and drying to a solids content of 90% in a convection oven at 105° C. The intrinsic viscosity of the polymer so-recovered was determined in 2 N NaOH at 25° C., and found to be 9.6 dl./g. A one-gram sample of the dried polymer was suspended in 200 ml. of 2 N sodium hydroxide solution and stirred for 3 hours. The resulting solution was centrifuged and the solution decanted from insoluble gel particles thrown down. The gel particles were washed twice with distilled water, centrifuging after each wash. The precipitate was then washed with methanol, dried and weighed. The insoluble residue weighed 0.15 gram, indicating that 85% of the sodium acrylate polymer was soluble.

Another portion of the polymer was evaluated as a flocculating agent for the insoluble solids present in the digestion liquor obtained in the Bayer process for recovering alumina from bauxite, in comparison with two commercially available sodium acrylate polymers recommended by their respective suppliers as especially effective for this purpose. A stock solution of each polymer was prepared by suspending one gram of polymer in 200 ml. of preboiled, nitrogen-flushed, distilled water and rolling the bottle for 18 hours at 25° C. A synthetic digestion liquor was prepared by heating 295 grams of Jamaican Bauxite, 60 grams calcium oxide and 2,280 ml. of liquor resulting from the recovery of alumina in a commercial alumina plant in an autoclave at 247° C. This temperature was held for 30 minutes and then flash discharged into a bucket fitted with a vent. The resulting slurry was diluted to 3,000 ml. and measured into three one-liter graduated cylinders which were placed in a hot water bath maintained at 95° C. To each cylinder was added, in three portions, sufficient of one of the stock solutions to furnish 0.25 lb. flocculant per ton of bauxite digested, stirring the slurry with a plunger after addition of each portion. The plungers were removed; a rake stirrer, rotating at one r.p.m., inserted in each cylinder; and a timer started. Settling times were recorded at 100 ml. intervals and the settling rate in ft./hour calculated from the time between the 800–600 ml. levels. The observed results were as follows:

Polymer:                      Settling rate (ft./hr.)
Prior art—A _____ 12.4
Prior art—B _____ 10.0
Product of Ex. I _____ 66.4

It is at once apparent that the product made in accordance with the invention is five- to six-fold more effective than the present available sodium polyacrylate aids.

EXAMPLE II

A polymer of exceptionally high intrinsic viscosity was prepared following the general procedure of Example I except that the pH was adjusted to 12.4, the radiation intensity was 2,100 rads per hour and the total radiation dose was 1,800 rads. The product was a transparent rubbery gel, completely soluble in water. Approximately 50% of the monomer had been converted to a water-soluble polymer having an intrinsic viscosity of 12.0 deciliters per gram. At a dose rate of only 0.1 lb. per ton of bauxite in the flocculation test described in Example I, this polymer produced a settling rate of 48 feet per hour. It is to be noted that, in comparison with the commercial flocculants reported above, at only 40% of the dose a 4- to 5-fold increase in settling rate was obtained.

EXAMPLES III TO XIII

Sodium acrylate polymers were prepared following the general procedure of Example I with variations in solution concentration, pH, radiation intensity, and total dose as indicated in the following table. The fraction of monomer converted in each example is shown and each polymer is characterized by the fraction (percent) soluble by the test described in Example I. The intrinsic viscosities of representative polymers are also tabulated. In each example the reaction product was a stiff gel, suitable for direct dispersion in water to function as flocculating or thickening agents.

TABLE

| Example No. | Monomer concent., percent | pH | Radiation | | Monomer converted, percent | Intrinsic viscosity, dl./g. | Fraction soluble, percent |
| --- | --- | --- | --- | --- | --- | --- | --- |
| | | | Intens., R./hr. | Total, Rads | | | |
| III | 27.5 | 5.9 | 8,700 | 7,200 | 87 | ---- | 100 |
| IV | 34 | 6.3 | 8,700 | 5,800 | 78.5 | 7.5 | 100 |
| V | 40 | 8.6 | 8,700 | 4,300 | 81 | 10.1 | 100 |
| VI | 27.5 | 5.9 | 20,000 | 20,000 | 98 | ---- | 100 |
| VII | 40 | 6.3 | 20,000 | 10,000 | 100 | ---- | 93 |
| VIII | 27.5 | 5.9 | 50,000 | 50,000 | 100 | ---- | 90 |
| IX [1] | 40 | 11 | 8,700 | 5,200 | 95.5 | 10.1 | 100 |
| X | 27.5 | 5.9 | 100,000 | 50,000 | 100 | ---- | 100 |
| XI | 40 | 6.3 | 100,000 | 20,000 | 95 | ---- | 94.5 |
| XII | 34 | 6.3 | 100,000 | 10,000 | 81.5 | 5.7 | 100 |
| XIII | 40 | 10 | 8,700 | 6,500 | 96 | 9.5 | 92 |

[1] Solution contained 10% sodium carbonate during polymerization.

A particular advantage of the products of the present invention is their water-soluble gel form. Sodium polyacrylate products of the prior art have been prepared in dry powder form and dissolution of them for use as flocculants has been a long drawn out and tedious process involving slow sifting of the powdered product into a vortex of stirred water with continued stirring for several hours. Flocculant solutions of the present gel product, on the other hand, are readily prepared by simply pouring the gel product into water, letting it stand to imbibe water, and then stirring mildly for less than an hour. Aside from its convenience, the foregoing dissolution technique for the present gels has the distinct advantage that, by the avoidance of extensive stirring, the destructive effect of shear on the polymer molecular weight is avoided.

On the other hand if desired, the gel product of the present invention can be dried directly to any desired level of water content or can be precipitated with methanol or other non-solvent to produce a dry powdered product.

What is claimed is:

1. A process for preparing a substantially water-soluble, high-molecular weight polymer of sodium acrylate which comprises irradiating an aqueous sodium acrylate solution of 25 to 40 weight percent concentration, at a pH of from 4 to 14, with high energy ionizing radiation, at a dose rate of from 5,000 to 50,000 rads per hour, to a total dose of from 1,000 rads to that sufficient to convert substantially all of the monomer to a substantially water-soluble, high-molecular weight polymer and insufficient to convert the monomer to a substantially water-insoluble polymer.

2. The process of claim 1 wherein the said solution is at a pH of at least 8.

3. A process for preparing a substantially water-soluble, high-molecular weight polymer of sodium acrylate which comprises irradiating an aqueous sodium acrylate solution at a pH of about 4 to about 14, with high energy ionizing radiation, the conditions of reaction meeting the terms of the following equation:

$$\eta_i = \frac{[M]^{2.2} \times 5.17 \times 10^{-2}}{[I]^{0.14} \times [C]^{0.36}}$$

wherein $\eta_i$ is the intrinsic viscosity of the final polymer determined in 2 N sodium hydroxide at 25° C. in dl./g. and is above about 6, M is the concentration of said aqueous sodium acrylate solution in weight percent and is between about 25 and about 40, C is the percent conversion of sodium acrylate to polymer and is at least about 50, and I is intensity of radiation in R./hr. and is from 5,000 to 50,000.

4. A process of claim 1 wherein the irradiation is continued until at least 50% of the monomer is converted to polymer.

5. A process of claim 4 wherein the total dose is at least 1,800 rads.

6. A process of claim 1 wherein the total dose is from 1,800 to 50,000 rads.

7. A process of claim 1 wherein the dose rate is from 5,000 to 50,000 rads per hour, the total dose is from 1,800 to 50,000 rads, and from 50 to 100% of the monomer is converted to a substantially water-soluble, high-molecular weight polymer.

8. A process of claim 1 wherein the polymer produced has an intrinsic viscosity of at least 6 dl./g. in 2 N sodium hydroxide at 25° C.

9. A process of claim 7 wherein the high energy ionizing radiation is gamma radiation.

References Cited

UNITED STATES PATENTS

| | | | |
| --- | --- | --- | --- |
| 3,090,736 | 5/1963 | Bashaw et al. | 204—159.22 |
| 3,658,771 | 4/1972 | Volk et al. | 204—159.22 |
| 2,803,599 | 8/1957 | Tutwiler et al. | 204—159.22 |
| 2,940,912 | 6/1960 | McKusick | 204—159.22 |
| 3,058,899 | 10/1962 | Yanko et al. | 204—159.22 |
| 3,081,244 | 3/1963 | Campanile | 204—159.22 |
| 3,681,215 | 8/1972 | Peterson | 204—159.22 |

FOREIGN PATENTS

| | | | |
| --- | --- | --- | --- |
| 1,106,573 | 3/1968 | Great Britain | 204—159.22 |
| 683,476 | 3/1964 | Canada | 204—159.22 |

OTHER REFERENCES

Restaino et al.: "X-ray Initiated Polymerization of Crystalline Monomers," Journal of The American Chemical Society, vol. 78, No. 13, pp. 2939–2943 (July 1960).

WILBERT J. BRIGGS, Sr., Primary Examiner

U.S. Cl. X.R.

260—29.6 H, 80 M, 80 P